United States Patent
Yang (10) Patent No.: US 9,043,443 B2
(45) Date of Patent: May 26, 2015

(54) REAL-TIME STREAMING MEDIA PLAYING METHOD

(71) Applicant: Primax Electronics Ltd., Neihu, Taipei (TW)

(72) Inventor: Jung-Chang Yang, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 230 days.

(21) Appl. No.: 13/906,020

(22) Filed: May 30, 2013

(65) Prior Publication Data

US 2014/0317239 A1    Oct. 23, 2014

(30) Foreign Application Priority Data

Apr. 19, 2013  (TW) .............................. 102113940 A (51) Int. Cl.
| | |
|---|---|
| *H04L 29/06* | (2006.01) |
| *H04N 21/44* | (2011.01) |
| *H04N 1/21* | (2006.01) |
| *H04N 21/439* | (2011.01) |
| *H04L 12/70* | (2013.01) |
| *H04L 12/64* | (2006.01) |

(52) U.S. Cl.
CPC .......... *H04L 65/60* (2013.01); *H04N 21/44004* (2013.01); *H04N 1/2137* (2013.01); *H04N 21/4392* (2013.01); *H04L 2012/5607* (2013.01); *H04L 2012/6421* (2013.01)

(58) Field of Classification Search
CPC ............ H04N 1/2137; H04N 21/4392; H04N 21/44004; H04N 21/4147; H04L 2012/5607; H04L 2012/6421; H04L 65/108; H04L 67/02; G06Q 30/02; H04H 20/08; G06F 17/30017
See application file for complete search history.

(56) References Cited

U.S. PATENT DOCUMENTS

| | | | |
|---|---|---|---|
| 6,249,810 B1* | 6/2001 | Kiraly ............................ | 709/217 |
| 7,349,552 B2* | 3/2008 | Levy et al. ..................... | 382/100 |
| 2006/0062363 A1* | 3/2006 | Albrett ....................... | 379/101.01 |
| 2007/0033531 A1* | 2/2007 | Marsh ............................ | 715/738 |
| 2008/0249986 A1* | 10/2008 | Clarke-Martin et al. ......... | 707/3 |
| 2011/0083073 A1* | 4/2011 | Atkins et al. ................... | 715/704 |
| 2012/0268553 A1* | 10/2012 | Talukder .................... | 348/14.08 |
| 2013/0031162 A1* | 1/2013 | Willis et al. .................... | 709/203 |

* cited by examiner

*Primary Examiner* — Le H Luu
(74) *Attorney, Agent, or Firm* — Kirton McConkie; Evan R. Witt (57) ABSTRACT

A real-time streaming media playing method is provided. According to the present invention, plural streaming data are stored in an electronic device, plural time stamps are assigned to respective streaming data, and the plural streaming data are arranged according to the time sequence. When the user wants to listen to a specified section of the real-time streaming media, a designated section command is generated by dragging a scroll thumb. According to the position of the scroll thumb, a corresponding time stamp is selected by the electronic device. The streaming data corresponding to the selected time stamp is decoded by the electronic device, so that a designated section audio signal is generated.

10 Claims, 10 Drawing Sheets

FIG.9

REAL-TIME STREAMING MEDIA PLAYING METHOD

FIELD OF THE INVENTION

The present invention relates to a method for playing entertainment media, and more particularly to a method for playing real-time streaming media from an internet radio station.

BACKGROUND OF THE INVENTION

In recent years, the internet is popular to general users. Consequently, a variety of electronic entertainment media can be transmitted through the internet in order to be spread by the user or directed listened by the user. The conventional entertainment media include for example cassette tapes, CD discs, DVD discs, video tapes and conventional broadcasts. For example, the conventional entertainment media may be transmitted from a conventional broadcasting station to a radio to be listened by the user by a radio communication technology. Moreover, the conventional radio communication technology used in the conventional broadcasting station may be gradually replaced by a network transmission technology (e.g. through an internet radio station). The conventional entertainment media are in an electronic form of real-time streaming media, and transmitted to a computer system via network transmission. After the real-time streaming media are decoded by a multimedia playing program of the computer system, an audio signal corresponding to the real-time streaming media is generated. For example, the multimedia playing program for a Windows operating system is Windows Media Player.

A process of playing the real-time streaming media by the multimedia playing program will be illustrated as follows. Firstly, the real-time streaming media is transmitted to the computer system via network transmission. Then, the real-time streaming media are temporarily stored in a temporary memory of the computer system. Then, the temporarily-stored real-time streaming media are recorded by the multimedia playing program. Consequently, a corresponding audio signal is generated. After the audio signal is played, the temporarily-stored real-time streaming media are deleted. The above steps are repeatedly performed until the multimedia playing program is closed.

However, during the process of playing the real-time streaming media by the multimedia playing program, a scroll thumb is not shown on a scroll bar of a playing interface. Under this circumstance, the user fails to drag the scroll thumb to select the desired section of the real-time streaming media. The reason why the scroll thumb fails to be dragged is that the data of the real-time streaming media are real-time data. In other words, the real-time streaming media which is transmitted to the computer system is not a complete file. The real-time streaming media is different from the conventional entertainment media, which is a non-real-time file with a fixed play length. Consequently, when the real-time streaming media are decoded by the multimedia playing program, the multimedia playing program is neither able to realize the play length of the real-time streaming media nor able to select the desired section of the real-time streaming media.

When the user listens to the real-time streaming media from an internet radio station, if the user has to answer the phone, some problems may occur. For example, during the process of answering the phone, the user is unable to listen to the real-time streaming media. Under this circumstance, the contents of the real-time streaming media that are played in this section will be missed. Consequently, the subsequent contents of the real-time streaming media after the user answers the phone and the contents of the real-time streaming media before the user answers the phone fail to be continuously linked with each other.

Nowadays, smart phones and tablet personal computers have experienced great growth. Since many electronic devices such as smart phones and tablet personal computers can be in communication with the internet radio station through internet connection, these electronic devices can play real-time streaming media by executing the multimedia playing program. However, these electronic devices also face the above problems.

Therefore, there is a need of providing a real-time streaming media playing method for preventing from missing the real-time streaming media.

SUMMARY OF THE INVENTION

The present invention provides a real-time streaming media playing method for preventing from missing the real-time streaming media.

The present invention also provides a real-time streaming media playing method capable of selecting a desired section of the real-time streaming media.

In accordance with an aspect of the present invention, there is provided a real-time streaming media playing method for an internet radio station. The internet radio station provides plural broadcast channels. The real-time streaming media playing method includes the following steps. Firstly, an electronic device is in communication with the internet radio station via network transmission, and a real-time streaming media is transmitted from the internet radio station to the electronic device, wherein the real-time streaming media is composed of plural real-time streaming data collaboratively. Then, the plural real-time streaming data are decoded into a real-time audio signal by the electronic device, and the real-time audio signal is by the electronic device. If a temporary storing command is received by the electronic device, currently-received real-time streaming data are sequentially assigned to plural time stamps by the electronic device, and the plural time stamps and the currently-received real-time streaming data are temporarily stored into a temporary memory of the electronic device. If a designated section command is received by the electronic device, the time stamp corresponding to the designated section command is selected by the electronic device, and the real-time streaming data corresponding to the selected time stamp is decoding by the electronic device. Consequently, a corresponding designated section audio signal is generated.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
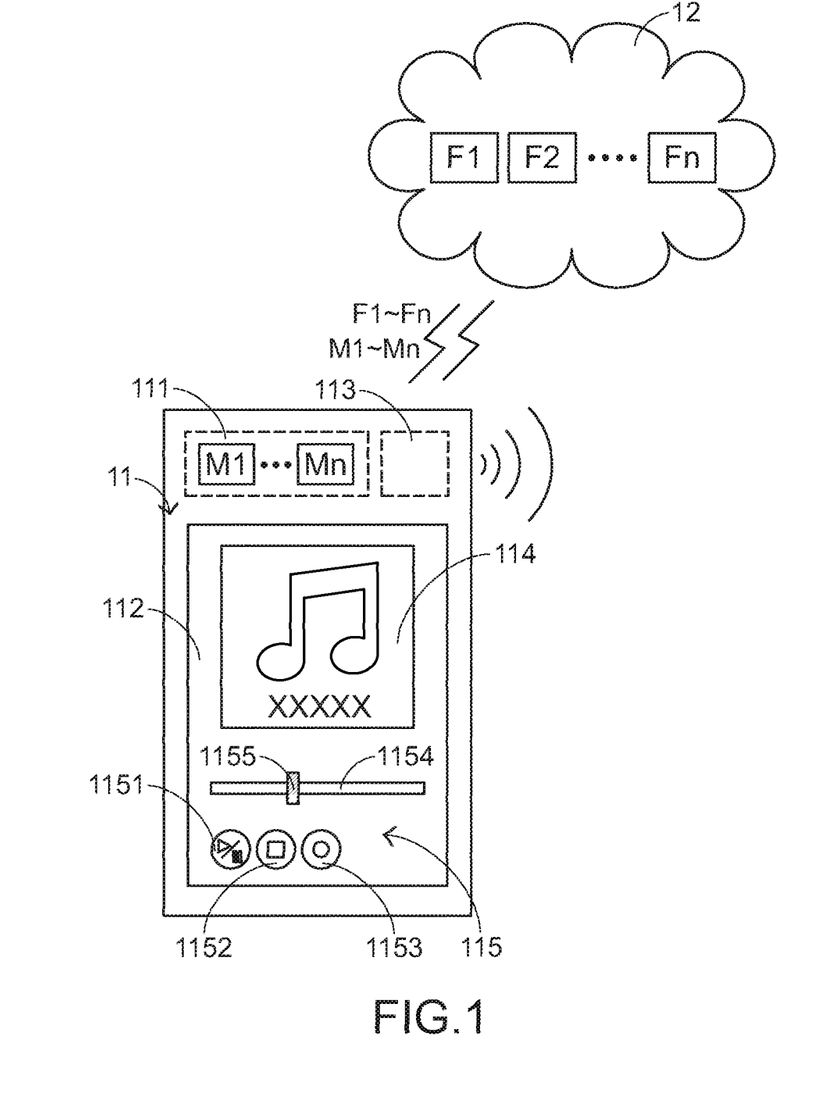
FIG. 1 schematically illustrates the architecture of a real-time streaming media playing system according to a first embodiment of the present invention.

For solving the drawbacks encounter from the prior art, the present invention provides a real-time streaming media playing method. The real-time streaming media playing method may be applied to a real-time streaming media playing system. Hereinafter, the architecture of the real-time streaming media playing system will be illustrated with reference to FIG. 1. FIG. 1 schematically illustrates the architecture of a real-time streaming media playing system according to a first embodiment of the present invention. As shown In FIG. 1, the real-time streaming media playing system comprises an electronic device 11 and an internet radio station 12. The electronic device 11 is in communication with the internet radio station 12 via network transmission. The internet radio station 12 provides plural broadcast channels F1~Fn corresponding to plural real-time streaming media, respectively. Each of the real-time streaming media comprises plural real-time streaming data M1~Mn. The electronic device 11 comprises a temporary memory 111, a display screen 112, and a speaker 113. The temporary memory 111 is used for temporarily storing the real-time streaming media from the internet radio station 12.

The display screen 112 is used for displaying a playing interface 114 and an operating interface 115. The information (e.g. the broadcast channel and the sound volume) about the played real-time streaming media is shown on the playing interface 114. The operating interface 115 comprises a play/pause icon 1151, a stop icon 1152, a temporary storing icon 1153 and a scroll bar icon 1154. The speaker 113 is used for outputting an audio signal corresponding to the real-time streaming media. In this embodiment, the electronic device 11 is an audio player, and the display screen 112 is a touch screen for facilitating the user to operate the operating interface 115 in a touch control manner. Alternatively, in some other embodiments, the display screen is a non-touch screen, and the operating interface is composed of at least one physical operating key.

Figure 2A:
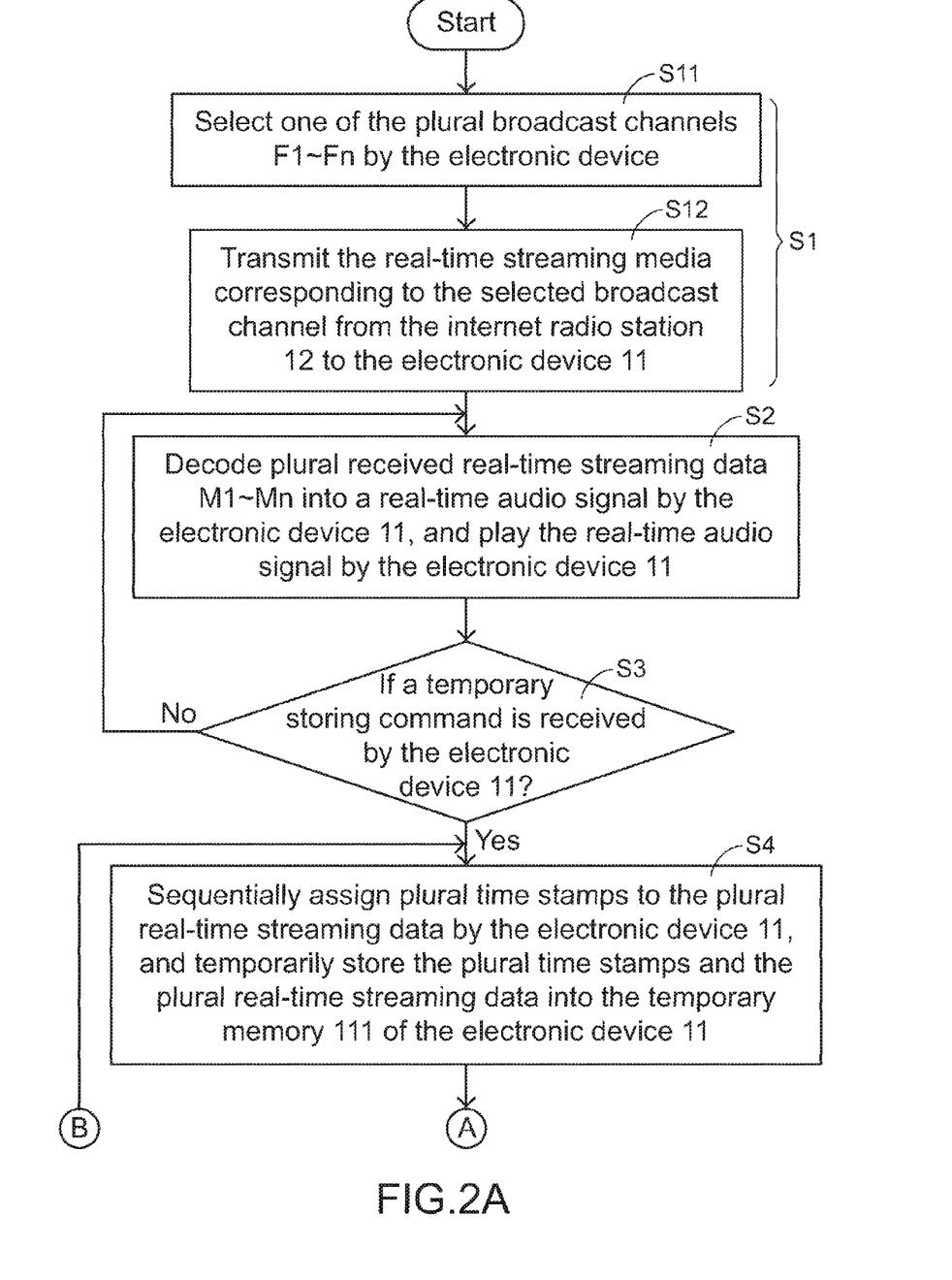
FIGS. 2A and 2B schematically illustrate a flowchart of a real-time streaming media playing method applied to the real-time streaming media playing system according to the first embodiment of the present invention.
Figure 2B:
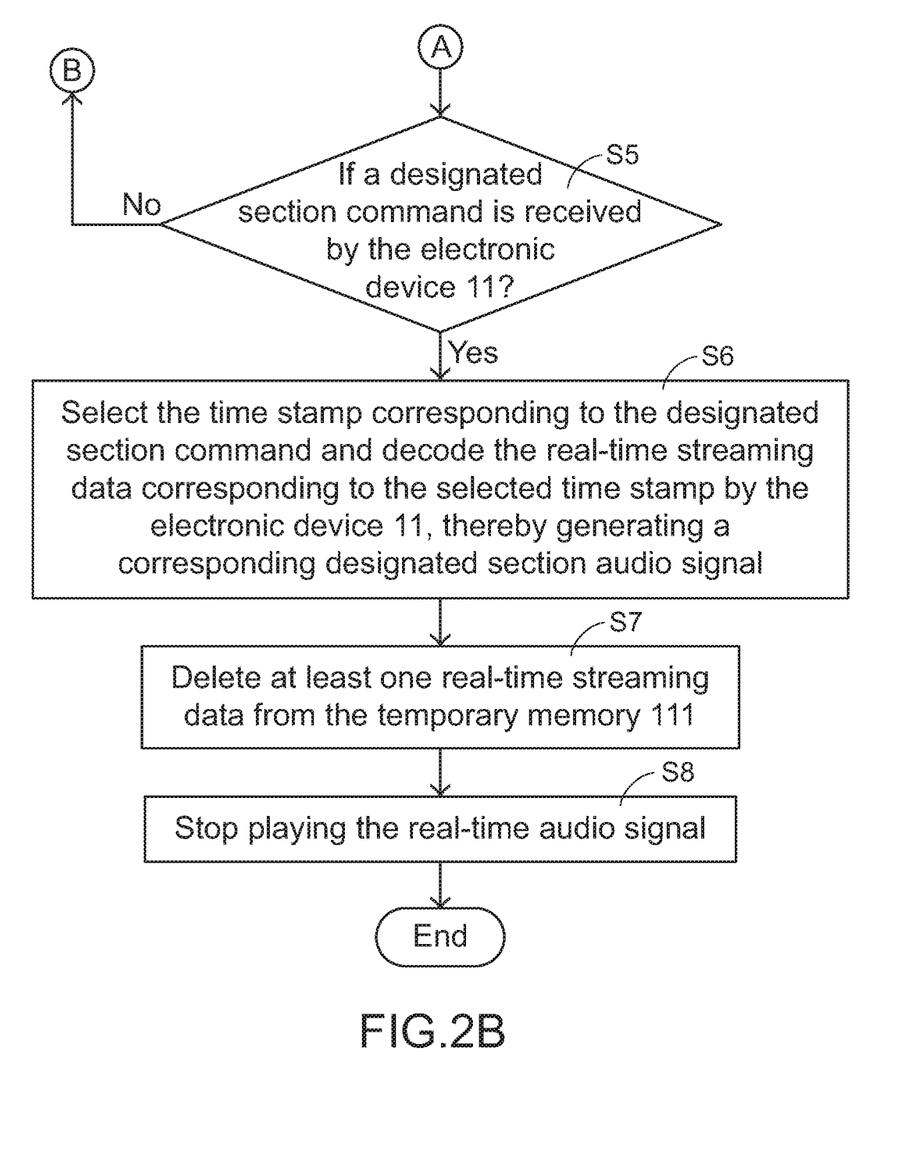

FIGS. 2A and 2B schematically illustrate a flowchart of a real-time streaming media playing method applied to the real-time streaming media playing system according to the first embodiment of the present invention. The method comprises the following steps. Firstly, in the step S1, the electronic device 11 is in communication with the internet radio station 12 via network transmission, and a real-time streaming media is transmitted from the internet radio station 12 to the electronic device 11. In the step S2, plural received real-time streaming data M1~Mn are decoded into a real-time audio signal by the electronic device 11, and the real-time audio signal is played by the electronic device 11. The step S3 is performed to judge whether a temporary storing command is received by the electronic device 11. In the step S4, plural time stamps are sequentially assigned to the plural real-time streaming data by the electronic device 11, and the plural time stamps and the plural real-time streaming data are temporarily stored in the temporary memory 111 of the electronic device 11. The step S5 is performed to judge whether a designated section command is received by the electronic device 11. In the step S6, the time stamp corresponding to the designated section command is selected by the electronic device 11, and the real-time streaming data corresponding to the selected time stamp is decoded by the electronic device 11, so that a corresponding designated section audio signal is generated. In the step S7, at least one real-time streaming data is deleted from the temporary memory 111. In the step S8, the real-time audio signal is no longer played. In this embodiment, the step S1 further comprises the sub-steps Si 1 and S12. In the sub-step S11, one of the plural broadcast channels F1~Fn is selected by the electronic device 11. In the sub-step S12, the real-time streaming media corresponding to the selected broadcast channel is transmitted from the internet radio station 12 to the electronic device 11.

In case that the real-time streaming media is received by the electronic device 11 in the step S1, the step S2 is automatically performed. If it is determined that the temporary storing command is received by the electronic device 11 in the step S3, the step S4 is performed. Whereas, if it is determined that the temporary storing command is not received by the electronic device 11 in the step S3, the step S2 is performed again. If it is determined that the designated section command is received by the electronic device 11 in the step S5, the step S6 is performed. Whereas, if it is determined that the designated section command is not received by the electronic device 11 in the step S5, the step S4 is performed again.

Figure 3:
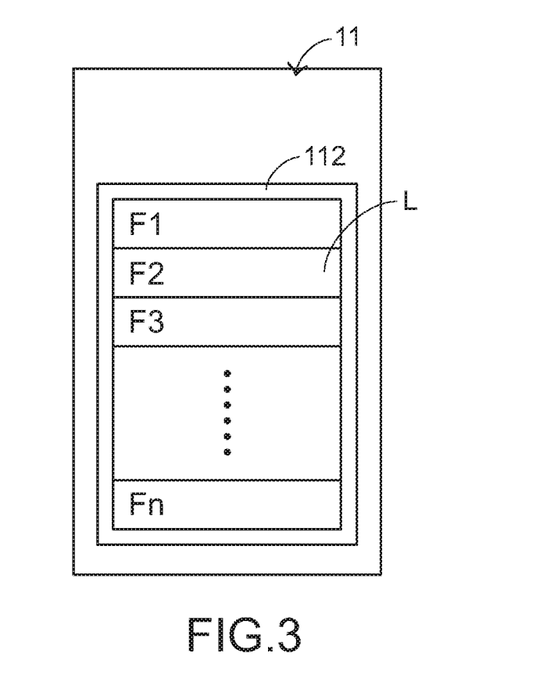
FIG. 3 schematically illustrates a broadcast channel list shown on the electronic device of the real-time streaming media playing system according to the first embodiment of the present invention.

Hereinafter, the operations of the real-time streaming media playing method of the present invention will be illustrated with reference to FIGS. 1~3. FIG. 3 schematically illustrates a broadcast channel list shown on the electronic device of the real-time streaming media playing system according to the first embodiment of the present invention. When the user wants to listen to the real-time streaming media from the internet radio station 12 through the electronic device 11, the electronic device 11 is in communication with the internet radio station 12 via network transmission. After the electronic device 11 is in communication with the internet radio station 12, a broadcast channel list L is shown on the display screen 112 of the electronic device 11. The plural broadcast channels F1~Fn are shown on the broadcast channel list L (see FIG. 3). Meanwhile, the user may select one broadcast channel (e.g. the broadcast channel F2) from the plural broadcast channels F1~Fn (i.e. the step S11). Then, the real-time streaming media corresponding to the selected broadcast channel F2 is transmitted from the internet radio station 12 to the electronic device 11 (i.e. in the step S12). It is noted that the real-time streaming media is composed of plural real-time streaming data M1~Mn. Moreover, the electronic device 11 is programmed to receive one real-time streaming data at each time. For example, the size of each real-time streaming data is 10 KB (Kilo bytes). The size of each real-time streaming data may be set according to the capacity of the temporary memory 111 of the electronic device 11. For example, the real-time streaming data M1 is received by the electronic device 11 at a first second; the real-time streaming data M2 is received by the electronic device 11 at a second; and the rest may be deduced by analogy.

After the real-time streaming data M1 of the real-time streaming media is temporarily stored in the temporary memory 111, the real-time streaming data M1 is decoded into a real-time audio signal by the electronic device 11, and the real-time audio signal is played by the speaker 113 of the electronic device 11 (i.e. in the step S2). Consequently, the user can listen to the radio. At the time when the real-time streaming data M1 of the real-time streaming media is temporarily stored in the temporary memory 111, the real-time streaming data M2 of the real-time streaming media is received by the electronic device 11. The rest may be deduced by analogy. The subsequent real-time streaming data M3~Mn are continuously transmitted to the electronic device 11. When the real-time audio signal is played by the electronic device 11, the playing interface 114 and the operating interface 115 are displayed on the display screen 112 of the electronic device 11. The operating interface 115 comprises the play/pause icon 1151, the stop icon 1152, the temporary storing icon 1153 and the scroll bar icon 1154 (see FIG. 1).

Then, the step S3 is performed to judge whether a temporary storing command is received by the electronic device 11. If no temporary storing command is received by the electronic device 11, the subsequent real-time streaming data M3~Mn are continuously received by the electronic device 11, and these real-time streaming data M3~Mn are decoded into corresponding real-time audio signals.

Figure 4:
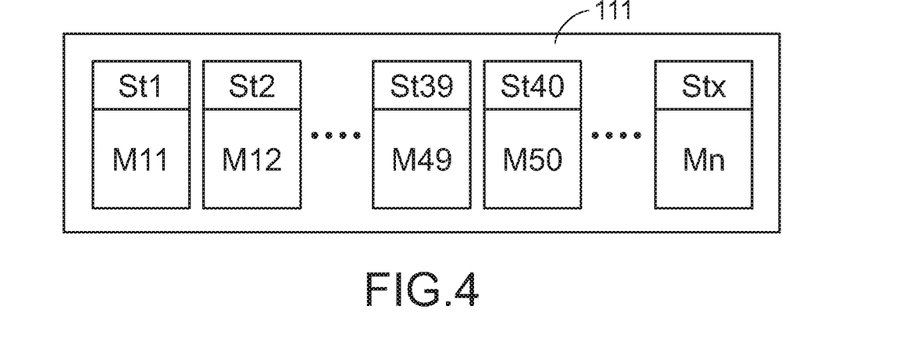
FIG. 4 schematically illustrates plural time stamps and plural real-time streaming data temporarily stored in the temporary memory of the electronic device of the real-time streaming media playing system according to the first embodiment of the present invention.

It is assumed that plural real-time streaming data M1~M10 have been received by the electronic device 11. At this moment, if the user is temporarily unable to listen to radio and has to leave the electronic device 11, a temporary storing command is generated by pressing the temporary storing icon 1153 of the operating interface 115. Consequently, it is judged that the temporary storing command is received by the electronic device 11. In response to the temporary storing command, the electronic device 11 will sequentially assign plural time stamps St1~Stx to the plural real-time streaming data M11~Mn that are currently received by the electronic device 11, and temporarily store the plural time stamps St1~Stx and the plural real-time streaming data M11~Mn into the temporary memory 111 (i.e. in the step S4). As shown in FIG. 4, the plural time stamps St1~Stx are sequentially assigned according to the time sequence. For example, the time stamp St1 corresponds to the real-time streaming data M11 at the eleventh second; the time stamp St2 corresponds to the real-time streaming data M12 at the twelfth second; and the rest may be deduced by analogy. Consequently, the plural real-time streaming data M11~Mn stored in the temporary memory 111 may be arranged according to the time sequence.

Of course, at the time when the plural real-time streaming data M11~Mn are stored into the temporary memory 111, the plural real-time streaming data M11~Mn are decoded by the electronic device 11, and the real-time audio signals corresponding to the plural real-time streaming data M11~Mn are played by the speaker 113 of the electronic device 11. On the other hand, a scroll thumb 1155 is shown on the scroll bar icon 1154 of the operating interface 115, and the scroll thumb 1155 starts to be moved along the scroll bar icon 1154 in the beginning of the generation of the temporary storing command. Then, the step S5 is performed to judge whether a designated section command is received by the electronic device 11. If the designated section command is not received by the electronic device 11, the real-time audio signals corresponding to the plural real-time streaming data M11~Mn are continuously played.

Figure 5A:
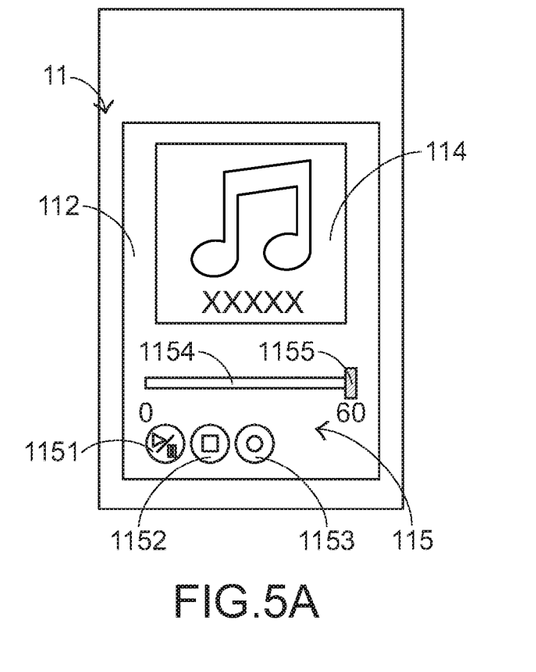
FIGS. 5A and 5B schematically illustrate the scroll thumb and the scroll bar icon of the electronic device of the real-time streaming media playing system according to the first embodiment of the present invention.

It is assumed that the user has left the electronic device 11 for 60 seconds (i.e. the current time point is the seventieth second). If the temporary memory 111 has sufficient capacity, the real-time streaming media having a total length of sixty seconds has been stored in the temporary memory 111. Meanwhile, the scroll thumb 1155 is moved to the sixtieth-second position of the scroll bar icon 1154 (see FIG. 5A). After the user comes back to use the electronic device 11, the real-time streaming data M71 at the sixty-first second is played by the electronic device 11. The subsequent contents of the real-time streaming media after the user comes back to use the electronic device 11 the contents of the real-time streaming media before the user leaves the electronic device 11 fail to be linked with each other. That is, a total length of 60 seconds of the contents of the real-time streaming media (i.e. the contents corresponding to the section from the first second to the sixtieth second of the scroll bar icon 1154) during the user leaves the electronic device 11 are missed.

Figure 5B:
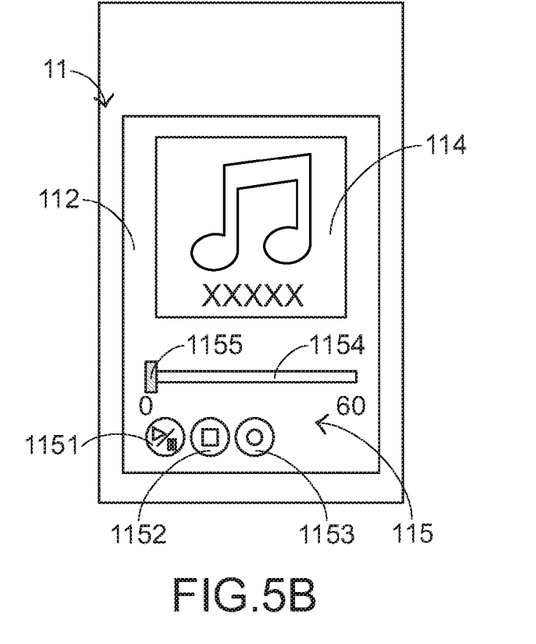

When the user wants to listen to the contents of the real-time streaming media during the 60 seconds, the user may drag the scroll thumb 1155 of the operating interface 115 to a first end of the scroll bar icon 1154 (i.e. the first-second position). Consequently, a designated section command is generated (i.e. in the step S6). When the designated section command is received by the electronic device 11, the time stamp corresponding to the designated section command is selected from the temporary memory 111 of the electronic device 11. The time stamp corresponding to the first-second position is the time stamp St1, and the real-time streaming data corresponding to the time stamp St1 is the real-time streaming data M11. Then, the real-time streaming data M11 is decoded by the electronic device 11, so that a corresponding designated section audio signal is generated (i.e. in the step S6). The designated section audio signal indicates the contents of the real-time streaming media during the user leaves the electronic device 11. In addition, the designated section audio signal is outputted from the speaker 113. The scroll thumb 1155 is continuously moved from the first end of the scroll bar icon 1154 to a second end of the scroll bar icon 1154 (see FIG. 5B).

From the above discussions above the real-time streaming media playing method of the present invention, the plural real-time streaming data M1~Mn that are sequentially received by the electronic device 11 are temporarily stored in the temporary memory 111, and the plural time stamps St1~Stx are assigned to the plural real-time streaming data M11~Mn, respectively. According to the plural time stamps St1~Stx, the electronic device 11 can realize which real-time streaming data corresponding to the designated section should be decoded, and thus the correct designated section audio signal can be generated. In other words, the method of the present invention is capable of selecting a desired section of the real-time streaming media in real time and at will.

Of course, the user may drag the scroll thumb 1155 along the scroll bar icon 1154 according to her (or his) preference while skipping the undesired broadcasting contents. For example, if the broadcasting contents in the section from the first-second position to the twentieth-second position of the scroll bar icon 1154 are advertisement or undesired contents, the user may skip the broadcasting contents. For example, as mentioned above, the user may drag the scroll thumb 1155 to the fortieth-second position of the scroll bar icon 1154 in order to generate the designated section command. Under this circumstance, the subsequent broadcasting contents can be listened by the user. When the scroll thumb 1155 is dragged to the fortieth-second position of the scroll bar icon 1154, the time stamp corresponding to the fortieth-second position is the time stamp St40, and the real-time streaming data corresponding to the time stamp St40 is the real-time streaming data M50. Then, the real-time streaming data M50 corresponding to the time stamp St40 is decoded by the electronic device 11, so that a corresponding designated section audio signal is generated and played by the speaker 113. At the same time, the real-time streaming data corresponding to the plural time stamps earlier than the time stamp St40 (i.e. the real-time streaming data M11~M49 corresponding to the time stamps St1~St39) will be deleted from the temporary memory 111 (i.e. in the step S7).

In this embodiment, the electronic device 11 is programmed to detect the real-time streaming data earlier than a specified time stamp when the scroll thumb 1155 is dragged to a position corresponding to the specified time stamp. Consequently, the temporary memory 111 can retain sufficient storing space. Alternatively, in some other embodiments, the electronic device is programmed to retain all of the real-time streaming data in response to the designated section command. Consequently, the broadcasting contents of the designated section can be listened many times.

Moreover, during the broadcasting contents which are stored in response to the temporary storing command are listened to the user, the subsequent real-time streaming media from the internet radio station 12 can still be received by the electronic device 11, and the subsequent real-time streaming media is still temporarily stored in response to the temporary storing command. For example, if the user comes back to use the electronic device 11 at the sixtieth second, during the user listens to the broadcasting contents in the play section from the zero-second position to the twentieth-second position, the play length of the real-time streaming media is continuously increased. That is, the play length of the real-time streaming media is increased from 60 seconds to 80 second until the electronic device 11 is turned off. Moreover, when the temporarily-stored broadcasting contents are listened to the user, the current real-time streaming media is still temporarily stored. Consequently, the real-time streaming media playing method of the present invention is capable of preventing from missing the desired broadcasting contents. Under this circumstance, the integrity of the real-time streaming media can be maintained.

Moreover, if the user wants to stop listening to the radio, the user may turn off the electronic device 11 or press the stop icon 1152 of the operating interface 115 in order to stop playing the real-time audio signal (i.e. in the step S8). Meanwhile, the real-time streaming data M1~Mn stored in the temporary memory 111 are deleted by the electronic device 11. Consequently, the real-time streaming media playing method is completed.

Figure 6:
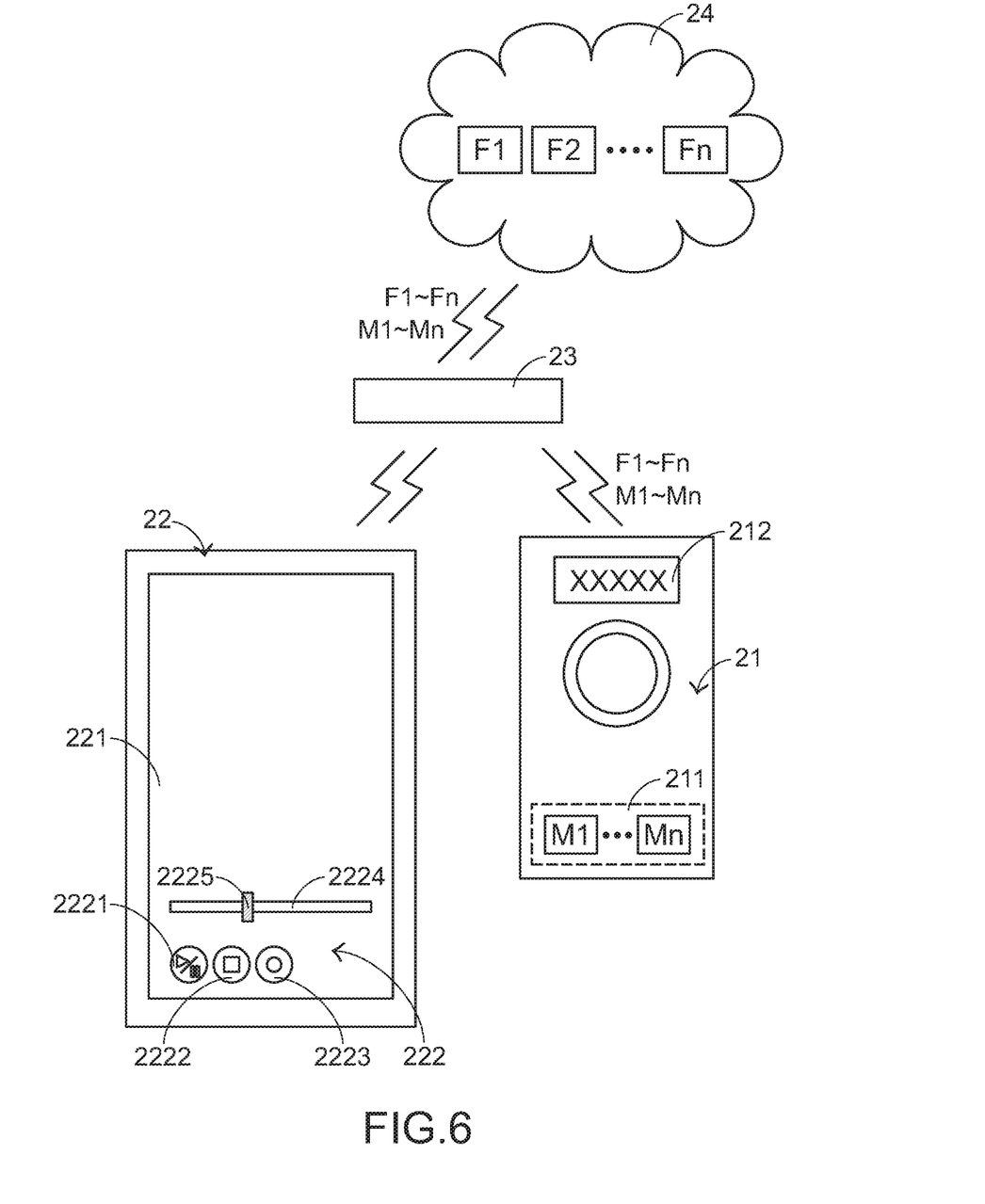
FIG. 6 schematically illustrates the architecture of a real-time streaming media playing system according to a second embodiment of the present invention.

The present invention further provides a second embodiment. FIG. 6 schematically illustrates the architecture of a real-time streaming media playing system according to a second embodiment of the present invention. As shown in FIG. 6, the real-time streaming media playing system comprises an electronic device 21, a remote controller 22, a network router 23, and an internet radio station 24. The electronic device 21 and the remote controller 22 are in communication with the network router 23 via network transmission. The internet radio station 24 is in communication with the network router 23 via network transmission. Consequently, the electronic device 21 is in communication with the remote controller 22 and the internet radio station 24 through the network router 23, and the remote controller 22 is in communication with the electronic device 21 and the internet radio station 24 through the network router 23.

The internet radio station 24 provides plural broadcast channels F1~Fn corresponding to plural real-time streaming media, respectively. Each of the real-time streaming media comprises plural real-time streaming data M1~Mn. The electronic device 21 comprises a temporary memory 211 and a playing interface 212. The temporary memory 211 is used for temporarily storing the real-time streaming media from the internet radio station 24. The information about the played real-time streaming media is shown on the playing interface 212. The remote controller 22 comprises a display screen 221. The display screen 221 is used for displaying an operating interface 222. The operating interface 222 comprises a play/pause icon 2221, a stop icon 2222, a temporary storing icon 2223 and a scroll bar icon 2224. A scroll thumb 222 is shown on the scroll bar icon 2224. In this embodiment, the electronic device 21 is a speaker.

The configurations of the real-time streaming media playing system including the electronic device 21, the remote controller 22, the network router 23 and the internet radio station 24 in this embodiment have been described as above. In comparison with the real-time streaming media playing system of the first embodiment, the remote controller 22 is used to execute the temporary storing command, the playing command and the designated section command, and the playing interface 212 is installed in the electronic device 21.

Figure 7:
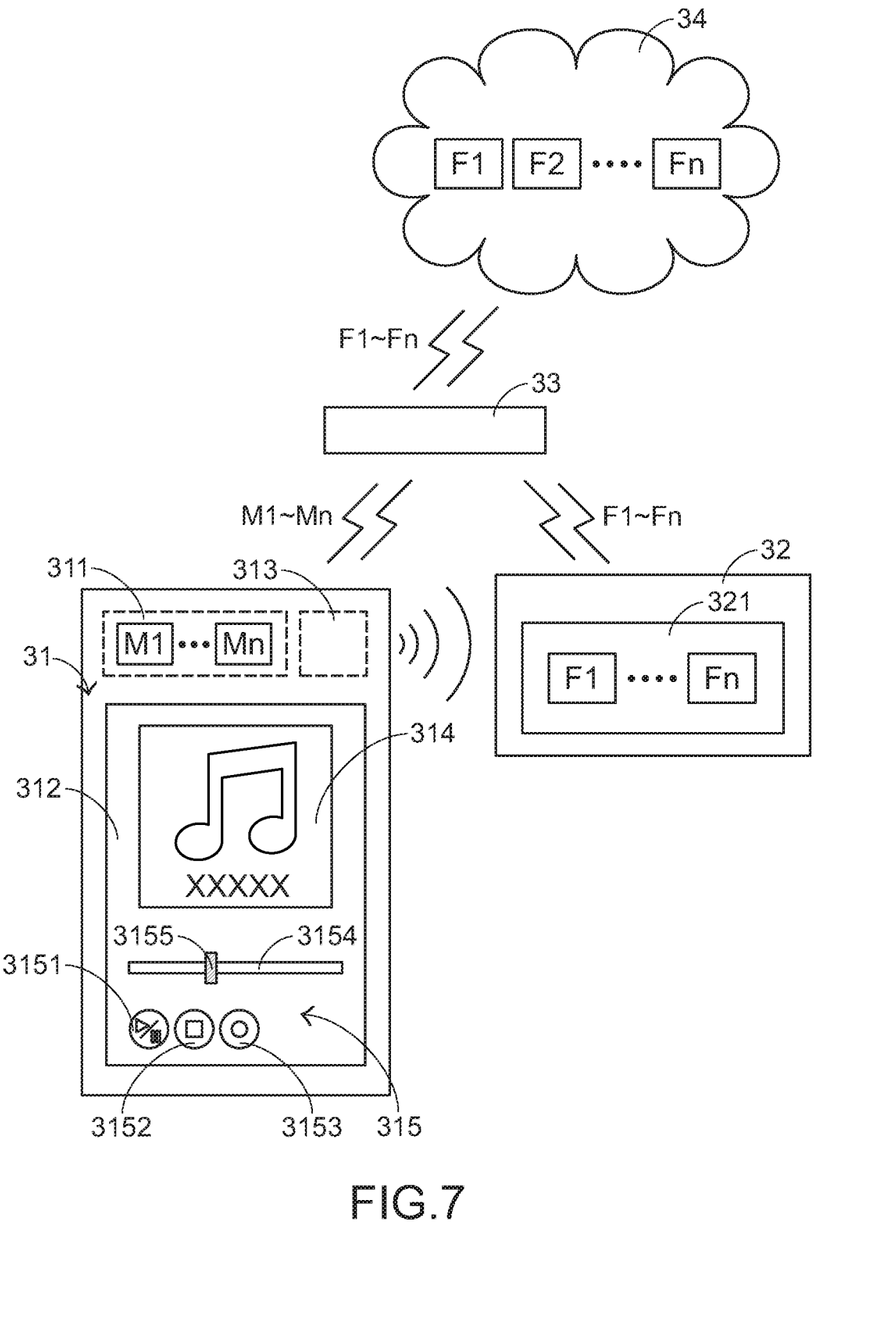
FIG. 7 schematically illustrates the architecture of a real-time streaming media playing system according to a third embodiment of the present invention.

The present invention further provides a third embodiment. FIG. 7 schematically illustrates the architecture of a real-time streaming media playing system according to a third embodiment of the present invention. As shown in FIG. 7, the real-time streaming media playing system comprises an electronic device 31, a media server 32, a network router 33, and an internet radio station 34. The electronic device 31 and the media server 32 are in communication with the network router 33 via network transmission. The internet radio station 34 is in communication with the network router 33 via network transmission. Consequently, the electronic device 31 is in communication with the media server 32 and the internet radio station 34 through the network router 33, the media server 32 is in communication with the electronic device 31 and the internet radio station 34 through the network router 33, and the internet radio station 34 is in communication with the electronic device 31 and the media server 32 through the network router 33.

Figure 9:
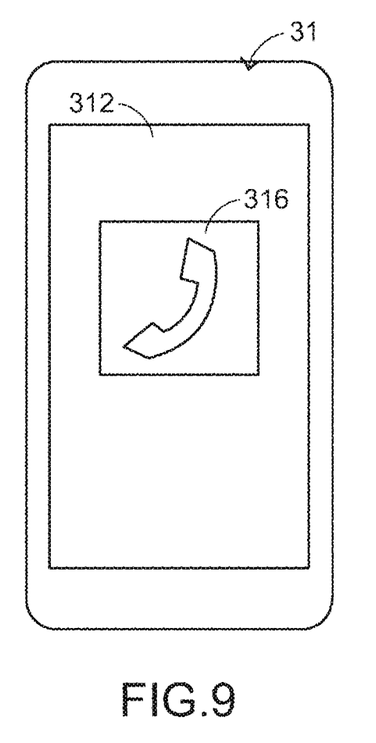
FIG. 9 schematically illustrates a communication interface of the electronic device of the real-time streaming media playing system according to the first embodiment of the present invention.

The internet radio station 34 provides plural broadcast channels F1~Fn corresponding to plural real-time streaming media, respectively. Each of the real-time streaming media comprises plural real-time streaming data M1~Mn. The electronic device 31 comprises a temporary memory 311, a display screen 312, and a speaker 313. The temporary memory 311 is used for temporarily storing the real-time streaming media from the internet radio station 34. The display screen 312 is used for displaying a playing interface 314, an operating interface 315, and a communication interface 316 (see FIG. 9). The information (e.g. the broadcast channel and the sound volume) about the played real-time streaming media is shown on the playing interface 314. The operating interface 315 comprises a play/pause icon 3151, a stop icon 3152, a temporary storing icon 3153 and a scroll bar icon 3154. A scroll thumb 3155 is shown on the scroll bar icon 3154. The speaker 313 is used for outputting an audio signal corresponding to the real-time streaming media. The media server 32 comprises a memory 321 for storing the plural broadcast channels F1~Fn from the internet radio station 34. In this embodiment, the electronic device 31 is a smart phone, and the display screen 112 is a touch screen. All of the electronic device 31, the media server 32, the network router 33, and the internet radio station 34 comply with a Digital Living Network Alliance (DLNA) protocol. Alternatively, in some other embodiments, the electronic device may be a tablet personal computer or a computer host.

Figure 8A:
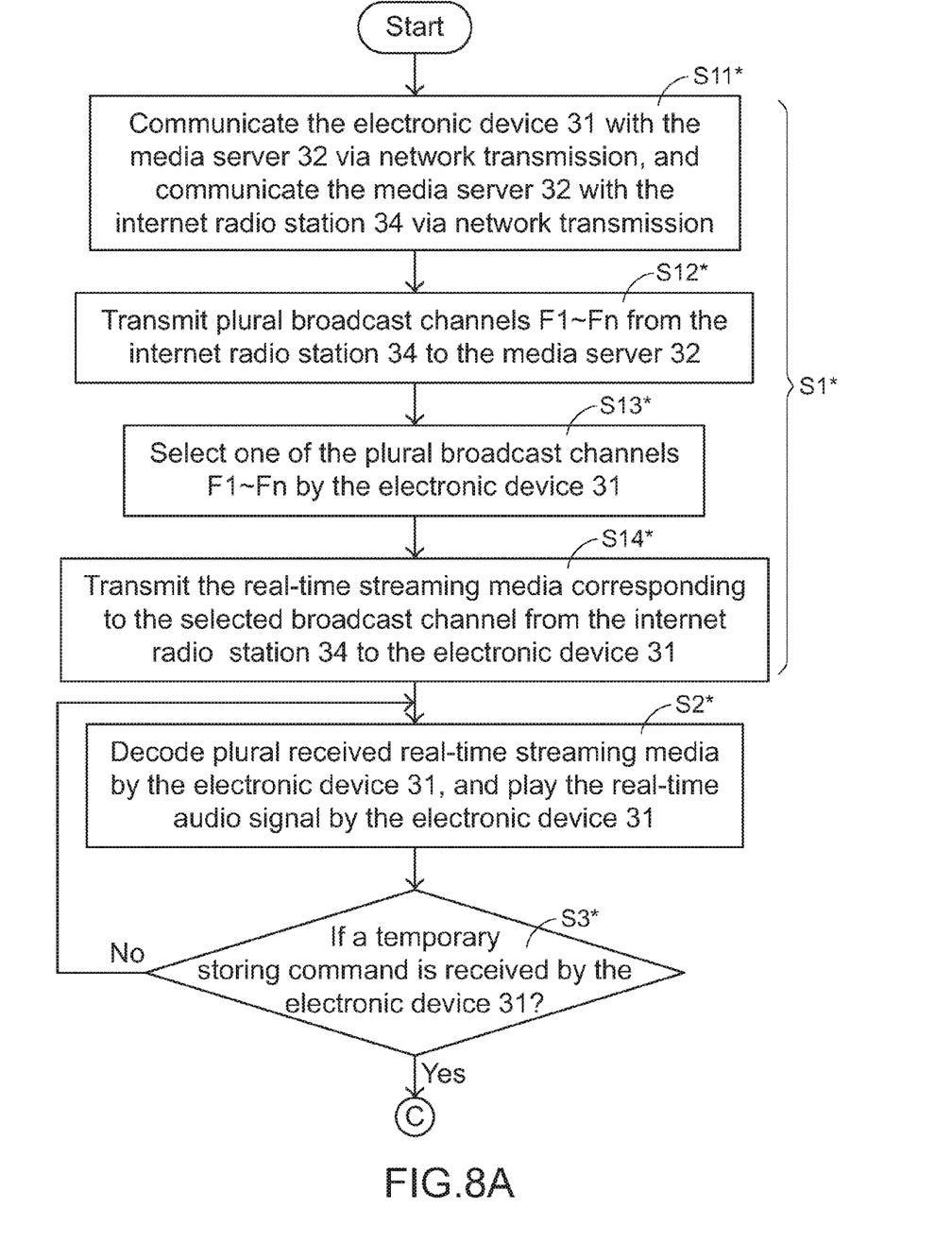
FIGS. 8A and 8B schematically illustrate a flowchart of a real-time streaming media playing method applied to the real-time streaming media playing system according to the third embodiment of the present invention.
Figure 8B:
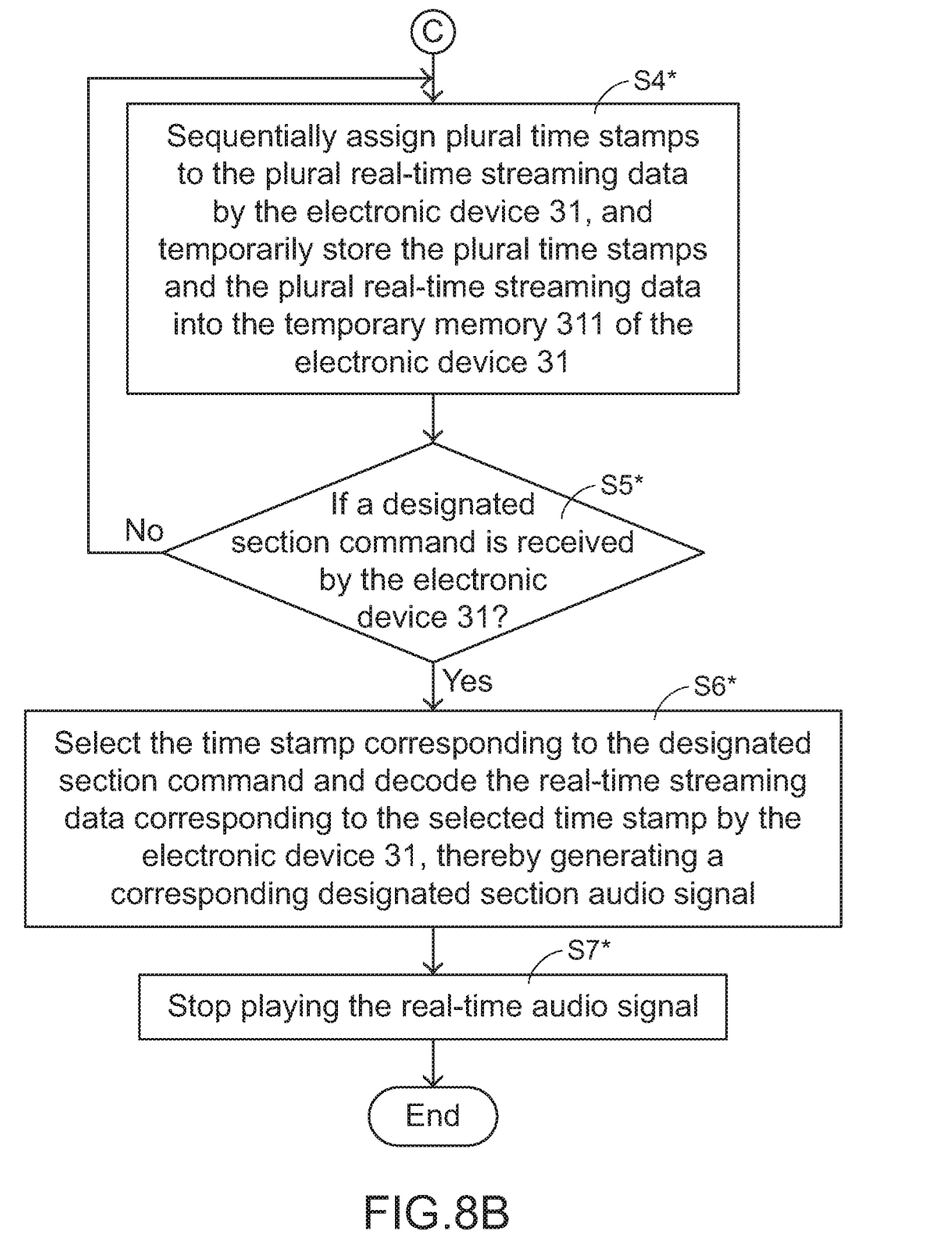

FIGS. 8A and 8B schematically illustrate a flowchart of a real-time streaming media playing method applied to the real-time streaming media playing system according to the third embodiment of the present invention. The method comprises the following steps. Firstly, in the step S1*, the electronic device 31 is in communication with the internet radio station 34 via network transmission, and the plural real-time streaming data M1~Mn are transmitted from the internet radio station 34 to the electronic device 31. In the step S2*, the real-time streaming media is decoded into a real-time audio signal by the electronic device 31, and the real-time audio signal is played by the electronic device 31. The step S3* is performed to judge whether a temporary storing command is received by the electronic device 31. In the step S4*, plural time stamps are sequentially assigned to the plural real-time streaming data by the electronic device 31, and the plural time stamps and the plural real-time streaming data are temporarily stored in the temporary memory 311 of the electronic device 31. The step S5* is performed to judge whether a designated section command is received by the electronic device 31. In the step S6*, the time stamp corresponding to the designated section command is selected by the electronic device 31, and the real-time streaming data corresponding to the selected time stamp is decoded by the electronic device 31, so that a corresponding designated section audio signal is generated. In the step S7*, the real-time audio signal is no longer played.

Except for the following three items, the method of this embodiment is substantially identical to that of the method of FIGS. 2A and 2B, and is not redundantly described herein. First of all, the step S1* further comprises the sub-steps S11*, S12, S13* and S14*. In the sub-step S11*, the electronic device 31 is in communication with the media server 32 via network transmission, and the media server 32 is in communication with the internet radio station 34 via network transmission. In the step S12*, plural broadcast channels F1~Fn are transmitted from the internet radio station 34 to the media server 32. In the step S13*, one of the plural broadcast channels F1~Fn is selected by the electronic device 31. In the step S14*, the real-time streaming media corresponding to the selected broadcast channel is transmitted from the internet radio station 34 to the electronic device 31. That is, during the process of acquiring the real-time streaming media, the electronic device 31 is firstly in communication with the media server 32 to acquire the a broadcast channel list including the plural broadcast channels F1~Fn, and then the network position of the internet radio station 34 is provided to the electronic device 31.

Secondly, if the user is temporarily unable to listen to radio and has to leave the electronic device 31, the user may press the temporary storing icon 3153 of the operating interface 315 to generate a temporary storing command in a passive driving mode similar to the first embodiment. More especially, in this embodiment, the electronic device 31 may be operated in an active driving mode. When the user listens to the radio, the playing interface 314 and the operating interface 315 are shown on the display screen 312. When the electronic device 31 is used to make a phone call, the communication interface 316 is shown on the display screen 312 (see FIG. 9). During the user listens to the radio, if a communication signal is received by the electronic device 31 and the electronic device 31 is used to make a phone call, the playing interface 314 and the operating interface 315 shown on the display screen 312 are switched to the communication interface 316. In addition, the real-time audio signal corresponding to the real-time streaming media is no longer played by the speaker 313, and a communication ringtone is played by the speaker 313. At the same time, the electronic device 31 automatically generates the temporary storing command in order to prevent from missing the real-time streaming media. Since the electronic device 31 can automatically generate the temporary storing command according to this embodiment, even if the operating interface 315 is not shown, the temporary storing command can be effectively executed.

Thirdly, when the scroll thumb 3155 is moved to a specified play section, the electronic device 31 is programmed to retain all real-time streaming data in order to maintain the integrity of the real-time streaming media. Consequently, the broadcasting contents can be repeatedly listened by the user.

From the above description, the present invention provides a real-time streaming media playing method. By using an electronic device to sequentially receive plural streaming data, assign plural time stamps to respective streaming data and temporarily store the plural streaming data and the time stamps, the electronic device can realize which real-time streaming data corresponding to the designated section should be decoded, and thus the correct designated section audio signal can be generated. In other words, the real-time streaming media playing method of the present invention is capable of selecting a desired section of the real-time streaming media in real time and at will. Moreover, when the temporarily-stored broadcasting contents are listened to the user, the real-time streaming media that is subsequently transmitted to the electronic device is still temporarily stored. Consequently, the real-time streaming media playing method of the present invention is capable of preventing from missing the desired broadcasting contents. Under this circumstance, the integrity of the real-time streaming media can be maintained.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A real-time streaming media playing method for an internet radio station, said internet radio station providing plural broadcast channels, said real-time streaming media playing method comprising steps of:

communicating an electronic device with said internet radio station via network transmission, and allowing said internet radio station to transmit a real-time streaming media to said electronic device, wherein said real-time streaming media is composed of plural real-time streaming data collaboratively;

decoding said plural real-time streaming data into a real-time audio signal by said electronic device, and playing said real-time audio signal by said electronic device;

if a temporary storing command is received by said electronic device, sequentially assigning plural time stamps to currently-received real-time streaming data by said electronic device, and temporarily storing said plural time stamps and said currently-received real-time streaming data into a temporary memory of said electronic device; and if a designated section command is received by said electronic device, selecting said time stamp corresponding to said designated section command by said electronic device, and decoding said real-time streaming data corresponding to said selected time stamp by said electronic device, thereby generating a corresponding designated section audio signal.

2. The real-time streaming media playing method according to claim 1, wherein said step of communicating said electronic device with said internet radio station via network transmission comprises sub-steps of:

selecting one of said plural broadcast channels by said electronic device; and transmitting said real-time streaming media corresponding to said selected broadcast channel from said internet radio station to said electronic device, so that said plural real-time streaming data are sequentially received by said electronic device.

3. The real-time streaming media playing method according to claim 1, wherein said step of communicating said electronic device with said internet radio station via network transmission comprises sub-steps of:

communicating said electronic device with a media server via network transmission, and communicating said media server with said internet radio station via network transmission;

transmitting said plural broadcast channels to said media server;

selecting one of said plural broadcast channels by said electronic device; and transmitting said real-time streaming media corresponding to said selected broadcast channel from said internet radio station to said electronic device, so that said plural real-time streaming data are sequentially received by said electronic device.

4. The real-time streaming media playing method according to claim 1, wherein when said plural real-time streaming data are decoded into said real-time audio signal by said electronic device, said real-time audio signal is played by a speaker of said electronic device, wherein when said designated section audio signal is received by said electronic device, said designated section audio signal is played by said speaker.

5. The real-time streaming media playing method according to claim 4, wherein said electronic device is a computer host, a smart phone, a tablet personal computer, an audio player or a remote controller.

6. The real-time streaming media playing method according to claim 5, wherein after said plural real-time streaming data into said real-time audio signal by said electronic device, said real-time audio signal is played by said electronic device and a playing interface is shown on said electronic device, wherein when said playing interface of said electronic device is disabled and a communication interface of said electronic device is shown, said real-time audio signal is not played by said electronic device, and said temporary storing command is automatically generated by said electronic device.

7. The real-time streaming media playing method according to claim 1, wherein said temporary storing command and said designated section command are generated via an operating interface or an operating key of said electronic device.

8. The real-time streaming media playing method according to claim 1, wherein said electronic device is a speaker, and said temporary memory is installed in said speaker.

9. The real-time streaming media playing method according to claim 8, wherein said temporary storing command and said designated section command are generated via an operating interface or an operating key of a remote controller, wherein said remote controller is in communication with said speaker via network transmission.

10. The real-time streaming media playing method according to claim 1, wherein after said designated section audio signal is generated by said electronic device, said real-time streaming media playing method further comprises a step of deleting at least one of said plural real-time streaming data from said temporary memory, wherein said at least one time stamp corresponding to said deleting time stamp is earlier than said selected time stamp.

* * * * *